United States Patent
Böhm

(10) Patent No.: US 6,178,369 B1
(45) Date of Patent: Jan. 23, 2001

(54) METHOD AND REGULATING SYSTEM FOR APPLYING DEFINED ACTUATING FORCES

(75) Inventor: Jürgen Böhm, Oberneisen (DE)

(73) Assignee: Continental Teves AG & Co., OHG (DE)

( * ) Notice: Under 35 U.S.C. 154(b), the term of this patent shall be extended for 0 days.

(21) Appl. No.: 09/355,464

(22) PCT Filed: Jan. 30, 1998

(86) PCT No.: PCT/EP98/00507
§ 371 Date: Sep. 23, 1999
§ 102(e) Date: Sep. 23, 1999

(87) PCT Pub. No.: WO98/33690
PCT Pub. Date: Aug. 6, 1998

(51) Int. Cl.[7] ............................... G06F 7/70; G06F 19/00
(52) U.S. Cl. ................... 701/70; 701/71; 701/77; 188/1.11 E; 188/382; 188/158; 303/199; 303/20
(58) Field of Search .................. 701/70, 71, 77, 701/78; 303/168, 199, 20; 188/382, 158, 1.11 E

(56) References Cited

U.S. PATENT DOCUMENTS

| | | | |
|---|---|---|---|
| 3,790,225 | * 2/1974 | Wehde | 303/113.4 |
| 5,125,483 | * 6/1992 | Kitagawa et al. | 188/158 |
| 5,217,280 | * 6/1993 | Nykerk et al. | 303/3 |
| 5,333,944 | * 8/1994 | Shirai et al. | 303/177 |
| 5,957,246 | * 9/1999 | Suzuki | 188/72.1 |
| 5,986,369 | * 11/1999 | Hanley et al. | 310/77 |
| 6,000,507 | * 12/1999 | Bohm et al. | 188/158 |
| 6,052,641 | * 4/2000 | Wuerth et al. | 701/70 |
| 6,068,352 | * 5/2000 | Kulkarni et al. | 303/20 |
| 6,076,034 | * 6/2000 | Satoh et al. | 701/70 |
| 6,079,801 | * 6/2000 | Zittlau | 303/150 |

\* cited by examiner

Primary Examiner—William A. Cuchlinski, Jr.
Assistant Examiner—Olga Hernandez
(74) Attorney, Agent, or Firm—Rader, Fishman & Grauer PLLC

(57) ABSTRACT

The present invention relates to a process and a control system for generating defined actuating forces in a brake which is electrically operable by way of an actuator, wherein there is a first static relation between the brake's actuating travel and the actuating force. The process and the control system permit determining the actuating forces which develop during operation without additional sensors. To achieve this object, according to the present invention, a second relation which corresponds to the operation of the brake is determined from the first relation and an information which represents the variations of the first relation.

15 Claims, 4 Drawing Sheets

METHOD AND REGULATING SYSTEM FOR APPLYING DEFINED ACTUATING FORCES

TECHNICAL FIELD

The present invention relates generally to vehicle brakes and more particularly to a process and a control system for generating defined actuating forces in a brake which is electrically operable by way of an actuator.

BACKGROUND OF THE INVENTION

International patent application WO 96/033010 discloses a disc brake which is preferably operable by way of an electric motor and a reduction gear. The special features of the prior art brake include that the rotor of the electric motor has an annular design and embraces the reduction gear radially. These provisions achieve that the axial overall length of the actuating unit is greatly shortened. However, the above-mentioned publication does not indicate how defined actuating forces can be generated during operation of the prior art brake.

There is a defined relation between the actuating travel $X_{Bet}$, by which the brake pads are pressed against the brake disc, and the actuating force $F_{Bet}$ generated. This relation can be modeled with sufficient accuracy by a mathematical model, for example, in the way of a static characteristic curve $F_{Bet}(X_{Bet})$. If this relation is known with sufficient accuracy, the actuating or displacement travel which corresponds to a desired actuating force and, in consideration of the gear reduction, the corresponding actuator position can be predetermined (nominal position value) and approached in a positionally controlled manner. This procedure corresponds to a control of the actuating force, i.e., there is an open action sequence (no sensor feedback) with respect to this physical quantity.

On the other hand, it is also possible to reconstruct the current actuating force due to the actuator position which is easily available under measuring technology aspects and is therefore known, by way of a parametric or non-parametric model. However, the clearance position must additionally be known in both cases. The quality of this control, exactly as the reconstruction (calculation) of the actuating force from the position signals of the actuator, depends on the model quality of the process (in this case: the characteristic curve). Because the characteristic curve under review in the operation of the brake is subject to certain significant changes, mainly due to temperature and wear, it is necessary to make an adaptation of this characteristic curve to the current condition of the brake in defined intervals. This adaptation must be effected on the basis of internal signals which are already provided in the electric brake system. This obviates the need for additional external sensor means (no direct measurement of the actuating force). From this results as a demand placed on the mathematical model for the electromechanically operable brake that it describes the behavior under review sufficiently precisely and that the signals used must comprise the desired information on the actuating force.

An object of the present invention is to propose a process and a control system which permit determining the actuating forces that develop during operation. Also, such determination be effected especially without the use of additional sensors.

In terms of process, this object is achieved because a second relation which corresponds to the operation of the brake is determined from the first relation and an information which represents variations of the first relation.

To specify the idea of the present invention, the information representing the variations of the first relation is determined by evaluation of signals which occur during braking operation, in particular, in a displacement travel of a static characteristic curve representing the first relation or in an extension or compression of the static characteristic curve which represents the first relation. The signals preferably represent the position of the actuator and the current value to be sent to the actuator.

In a preferred aspect of the subject matter of the present invention, the speed or the acceleration of the actuator is additionally determined.

Also, it is especially favorable that the second relation is determined according to the formula $$F_{Bet}=f(X_{Bet})=\lambda f_{Basis}(X_{Bet}-X_V) \qquad (1)$$

wherein $f_{Basis}$ is the first relation, $\lambda$ is an extension or compression factor, $X_{Bet}$ is the actuating travel of the brake, and $X_V$ is the displacement travel.

In another favorable feature of the present invention, a mathematical model of the brake which comprises the first relation is used wherein the portion of the current being supplied to the actuator, the said portion corresponding to the actuating force, is taken into account to determine both the extension or compression factor and the displacement travel by way of a parameter estimation process.

The established values of the extension or compression factor and of the displacement travel are checked for plausibility preferably before they are employed, and the parameter estimation process is monitored by using the signal representative of the speed of the actuator.

Therefore, the disclosed process of a model-based reconstruction of the actuating force focuses on the modeling of condition-induced variations of the basic characteristic curve (basis characteristic curve) and the methods of determining the adaptation parameters on the basis of internal actuator and brake signals. The latter signals are of major significance and provide the basis of a most accurate metering of the actuating force on the basis of internal actuator signals.

When using the updated static characteristic curve for the metering of the actuating force, principally two procedures are possible which will be reviewed in detail hereinbelow. Preferably, the actuating force as a function of the actuating travel is taken into consideration because in this case it is only necessary to consider the effective rigidity of the entire system and the condition-responsive variations thereof.

A control system according to the present invention for implementing the above-mentioned process distinguishes by the following provisions:

a) a position controller to which the control difference between a nominal actuator position and signals representative of the actual actuator position is sent as an input signal, and connected downstream of which controller is an electronic servo booster having an output signal which actuates the actuator, b) a characteristic curve adaptation and adaptation monitoring module to which the output signal of the servo booster and the signal representative of the actual actuator position are sent as input quantities, and which furnishes an information about variations of the first relation which occur during operation of the brake, c) and the information is sent to a performance graph module which calculates actuating travel nominal values from actuating force nominal values in consideration of the variation information, and connected downstream of which module is a conversion module which calculates the signals representative of the nominal actuator position from the actuating travel nominal values.

A second variation of the control system for implementing the process of the present invention includes the provision of a) a deceleration controller to which the control difference between signals representative of an actuating force nominal value and an actuating force actual value is sent as an input signal, and connected downstream of which controller is an electronic servo booster having an output signal which actuates the actuator, b) a characteristic curve adaptation and adaptation monitoring module to which the output signal of the servo booster and the signal representative of the actual actuator position are sent as input quantities, and which furnishes an information about variations of the first relation which occur during operation of the brake, on the one hand, and a signal representative of the actuating travel actual value, on the other hand, which signals c) are sent to a performance graph module which calculates actuating force actual values from the actuating travel actual values in consideration of the variation information.

The conversion module preferably represents a mathematical model of a gear that acts between the actuator and the brake. Besides, the information about variations of the first relation, which occur during operation of the brake, can be sent to the deceleration controller to update said's parameters.

When the brake is installed in an automotive vehicle it is especially appropriate that an information representative of the rotational speed of the automotive vehicle wheel is sent to the characteristic curve adaptation and adaptation monitoring module.

DETAILED DESCRIPTION OF THE PREFERRED EMBODIMENT

Figure 1:
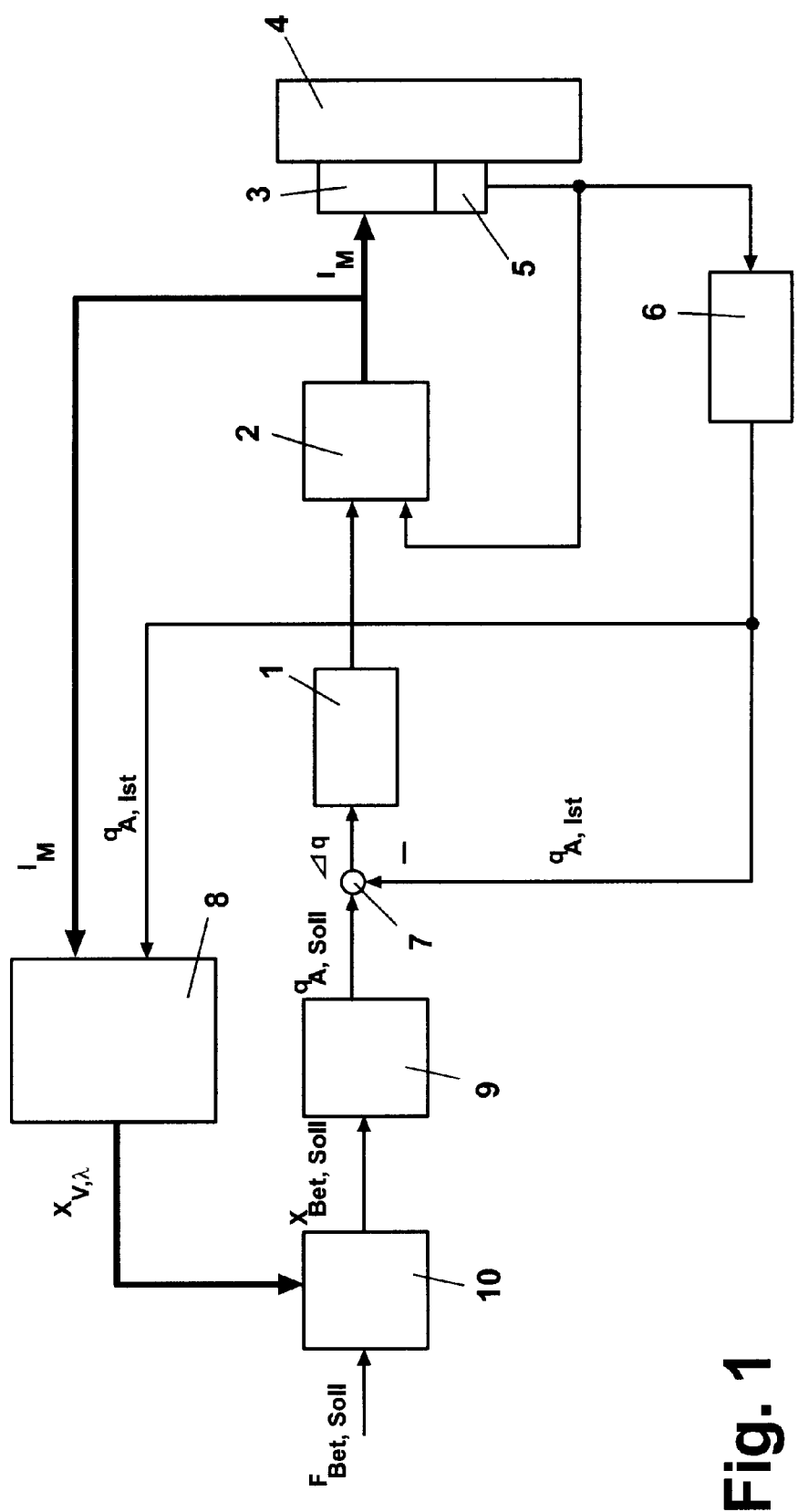
FIG. 1 is a first configuration of a control circuit for implementing the process of the present invention.

The control system illustrated in FIG. 1 is configured to convert the deceleration signal (in this case: preferably actuating force $F_{Bet,Soll}$) (signaled by the driver or predetermined by a superior function unit) into a corresponding nominal position value by means of an inverse characteristic curve stored in memory (actuating force control). The characteristic curve is updated by way of a mathematical model for the electromechanic brake including a model for the condition-responsive variation of the characteristic curve on the basis of actuator signal sensor means which is easily accessible using current measuring technology. The control system shown generally comprises a position controller 1 and an electronic servo booster 2 connected downstream of the position controller 1. The output signal $I_M$ of the booster is used to actuate an actuator 3 (indicated only schematically) of an electromechanically operable brake which is designated by reference numeral 4. The actuator 3 is preferably equipped with an angular position measuring system 5 whose output signal that is representative of the actuator actual position is sent to the servo booster 2, on the one hand, and to a position signal conditioning circuit 6, on the other hand. The output signal $q_{A,Ist}$ of the position signal conditioning circuit 6 is sent to a summation point 7, which is connected upstream of the position controller 1, on the one hand, and together with the signal $I_M$ is sent to a characteristic curve adaptation and adaptation monitoring module 8, on the other hand, wherein in addition the adaptation is monitored and the established adaptation parameters are checked for plausibility in order to increase the reliability. In the summation point 7, a deviation $\Delta q$ which is used as an input quantity of the position controller 1, is produced from a signal representative of an actuator nominal position $q_{A,Soll}$ and the above-mentioned signal $q_{A,Ist}$. The signal $q_{A,Soll}$ is preferably produced by a gear module 9 which takes into consideration the behavior of a reduction gear (not shown) that is interposed in terms of effect between the actuator 3 and the brake 4. Connected upstream of the gear module 9 is a performance graph module 10 in which is stored an inverse static characteristic curve f ($F_{Bet,Soll}$) of the partial system actuator 3—brake 4 and in which a signal $F_{Bet,Soll}$, which represents an actuating force nominal value that is predetermined, for example, by the driver of an automotive vehicle equipped with the above-mentioned brake or by a superior function unit, is converted into an actuating travel nominal value $X_{Bet,Soll}$ under the influence of the characteristic curve adaptation and adaptation monitoring module 8. The parameters $X_V$ and $\lambda$ which influence the conversion run in the performance graph module 10 and are furnished by the characteristic curve adaptation and adaptation monitoring module 8 provide an information about variations which occur during operation of the brake 4 with respect to the relation between the brake's actuating travel X and its actuating force F. $X_V$ refers to the shift of the basis characteristic curve in the direction $\pm X_{bet}$ and $\lambda$ refers to the extension or compression factor of the mentioned characteristic curve.

Figure 2:
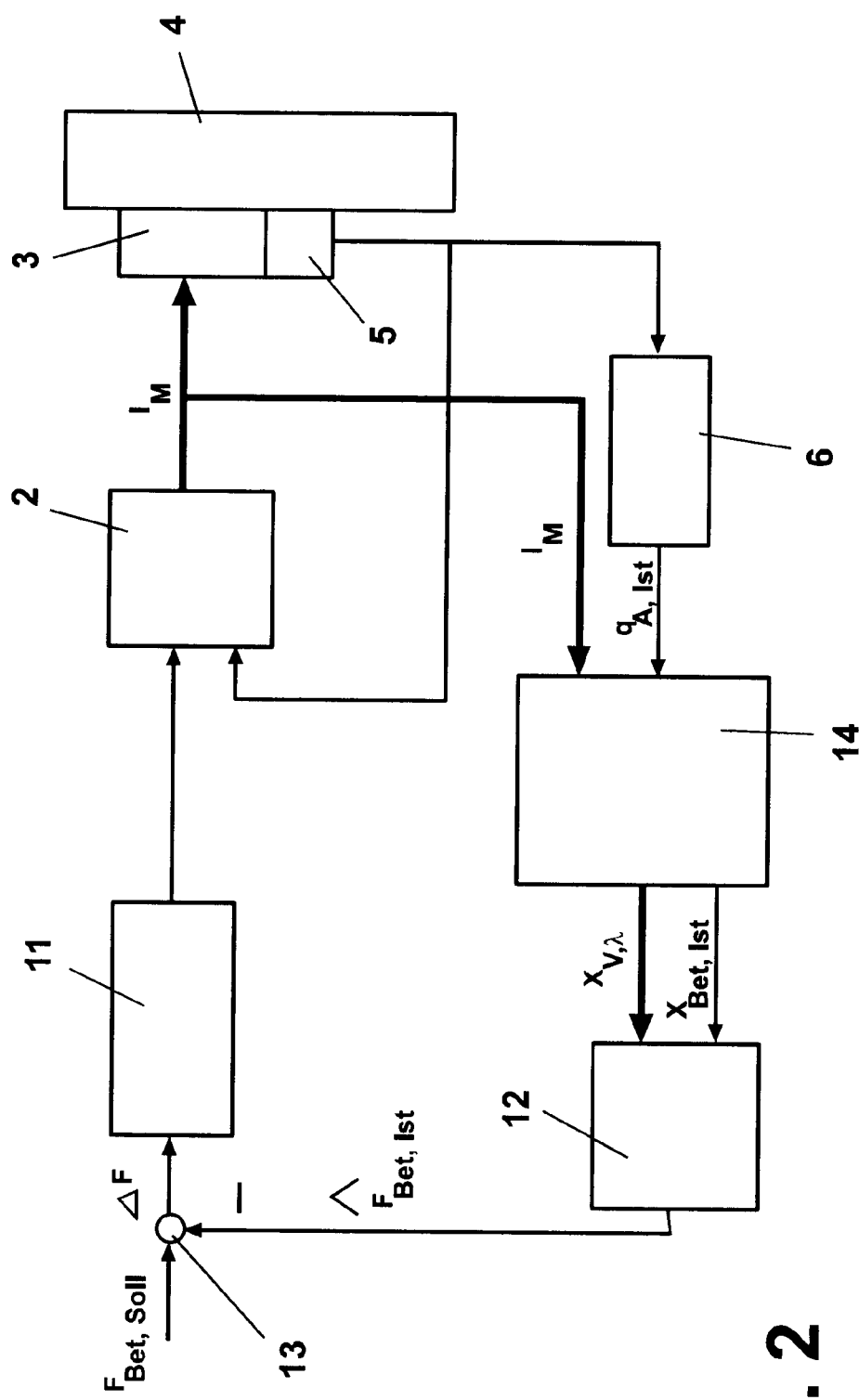
FIG. 2 is a second configuration of a control circuit for implementing the process of the present invention in a representation which corresponds to FIG. 1.

An important characteristic feature of the control system shown in FIG. 2 is the reconstruction of the deceleration wish signal (herein preferred: actuating force) from the measured position information by means of a memorized and updated characteristic curve for the actuating force control, as well as a characteristic curve adaptation and adaptation monitoring module which is generally based on actuator signal sensor means and mathematical models. A deceleration controller 11 is used in the control system shown instead of the position controller 1 mentioned with respect to the FIG. 1 embodiment. In all other respects, the circuit arrangement corresponds largely to the circuit diagram shown in FIG. 1. Connected downstream of the characteristic curve adaptation and adaptation monitoring module 14 which, in addition to the above-mentioned parameters $X_V$, $\lambda$, still furnishes a signal corresponding to an actuating travel actual value $X_{Bet,Ist}$ is a performance graph module 12 in which a static characteristic curve $f(X_{Bet,Ist})$ of the actuator-wheel brake assembly is stored. The output value $F_{Bet,Ist}$ of the module 12 is sent to a summation point 13 wherein a deviation $\Delta F$ that serves as an input quantity of the deceleration controller 11 is produced from the signal representing the above-mentioned actuating force nominal value $F_{Bet,Soll}$ and the signal $F_{Bet,Ist}$. The signal representing the actuating force nominal value $F_{Bet,Soll}$ is again predetermined (as in the arrangement according to FIG. 1), for example by the driver of an automotive vehicle equipped with the above-mentioned brake, or a superior function unit. In the performance graph module 12, the signal $X_{Bet,Ist}$ which represents the actuating travel actual value is converted into an actuating force actual value $F_{Bet,Ist}$ under the influence of the characteristic curve adaptation and adaptation monitoring module 14.

Figure 3:
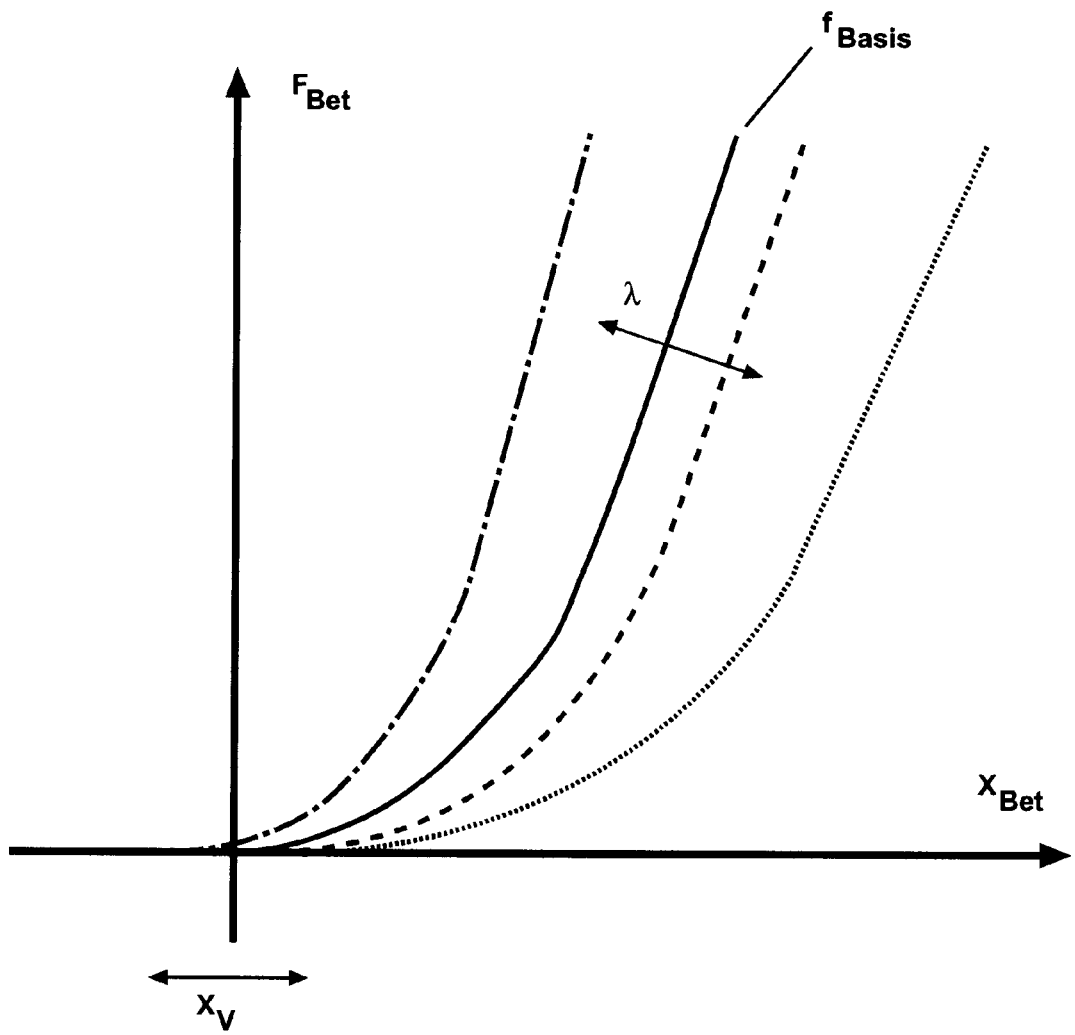
FIG. 3 is a diagram which illustrates the mode of function of the performance graph module shown in FIG. 2.

The following comments will be given on the static characteristic curve shown in FIG. 3 and referred to hereinabove.

A desired actuating force may be achieved by a defined displacement of the brake pads in relation to the brake disc. Therefore, the behavior of the process under review is generally identical to that of a spring system with a variable spring rigidity $K_E$ and can be modeled with sufficient accuracy by a static characteristic curve for the actuating force $F_{Bet}$ as a function of the actuating travel $X_{Bet}$:

$$F_{Bet}=K_E(X_{Bet}) \cdot X_{Bet}, \text{ for } X_{Bet}>0, \text{ otherwise } 0 \qquad (2)$$

The fundamental behavior of the electric brake is shown by a static force-travel characteristic curve, e.g., corresponding to equation (2). The curve may be depicted, for example, by significant pairs of points in a table with a certain number of support points. The division need not absolutely be equidistant. Intermediate points of this table are calculated online during braking operations by linear interpolation or extrapolation. Apart from the description by a non-parametric model in the above-mentioned fashion, other description modes, e.g., by a parametric model, are also possible. The characteristic curve which prevails in the form of a table represents a basis characteristic curve (index B or basis) and represents the static behavior of the electric brake in its 'normal condition'. Condition-responsive variations of this characteristic curve, generally by heating up and wear, must be sensed and adapted in the course of operation of the brake. It shall be assumed that the behavior formulated by the basis characteristic curve cannot principally be changed by condition-responsive variations of the static behavior of the brake and can be depicted by the following modifications of the basis characteristic curve:

shift of the basis characteristic curve by $X_v$ in the direction $\pm X_{Bet}$ and/or extension or compression of the shifted basis characteristic curve by a factor R.

The presently available characteristic curve can be generated by this model set-up from the basis characteristic curve corresponding to equation (1). The main object now involves determining the adaptation parameters in the current braking operation and thereby achieving updating of the static characteristic curve.

Figure 4:
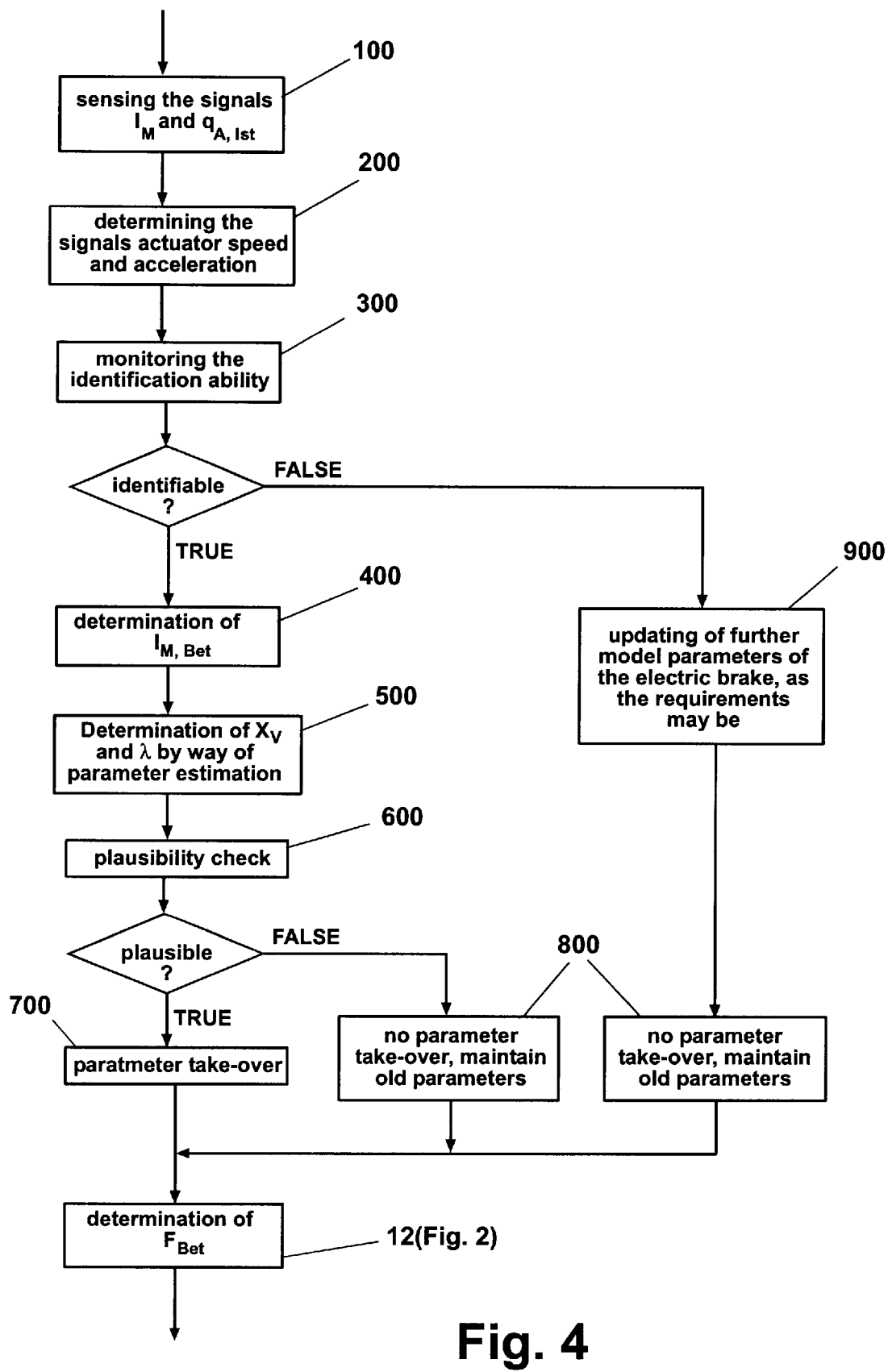
FIG. 4 is a flow chart which illustrates the mode of function of the performance graph adaptation and monitoring module shown in FIG. 2.

The basis for the method of reconstruction shown in FIG. 4 is the actuator position, which in general can be measured easily, and the basis characteristic curve which is updated continuously or when required by way of a corresponding model set-up with the aid of the internal actuator signals.

Following the recording of the actuator signals $I_M$ and $q_{A,Ist}$ (see function block 100) is the determination of the signals which correspond to the actuator speed and acceleration (see function block 200).

Prior to the determination of the adaptation parameters, it is checked by way of the direction of movement of the actuator whether the actuating force information can be detected in the actuator current in the present movement condition of the actuator and whether it is safely possible to determine the adaptation parameters based on actuator signals for updating the basis characteristic curve (see function block 300).

When the identification ability is detected, a condition estimation of $I_{M,Bet}$ (see function block 400) will follow. A basis characteristic curve $F_{Bet,B}(X_{Bet})$ memorized point-by-point for the electric brake is under review for this purpose so that, with the position $X_{Bet}$ known, an estimated value for the actuating force in the 'normal condition' can be determined by linear interpolation by way of the basis characteristic curve:

$$\hat{F}_{Bet,B}=m_B(i) \cdot X_{Bet}+b_B(i).$$

wherein $m_B$ is the rigidity of the entire system in the interval under review, $b_B$ is a force offset value, and i is the interval under review.

Equation (3) indicates the resultant actuating force with a defined displacement travel for the case that the present behavior of the electric brake exactly corresponds to that one of the basis characteristic curve. Condition-responsive variations of this characteristic curve are taken into account on the basis of the provisions shown in FIG. 3. The condition-responsive variations of the static behavior of the actuator-brake group are plotted by the following modification of the basis characteristic curve:

$$\hat{F}_{Bet}=\lambda \cdot m_B(i) \cdot X_{Bet}+b_B(i) \lambda \cdot m_B(i) \cdot X_V$$

The generation of an actuating force $F_{Bet}$ for the brake via the gear system stresses the actuator (in general: $I_{M,Bet}$) For example, when the actuator is an electric motor, this force causes a load torque. The actuator current $I_M$ is exactly so great that the load forces (generally friction and load by the actuating force) which act on the actuator can be compensated, and the actuator including the coupled mechanics accelerates to the commanded speed. (There is a defined (known) relation characterizing the actuator between the actuator current and the actuator force/torque which produces the actuator movement. This relation is linear in many cases.) In this configuration, the full information about load forces or torques which counteract the actuator, especially about the generated actuating force, is therefore comprised in the actuator current or actuator force or torque in this configuration.

The condition estimation of $I_{M,Bet}$ (see function block 300) is effected by way of the measured actuator signals with the aid of an interference signal observer, based on a mathematical model for the electromechanic drive train of the electric brake. It should be taken into account that the reconstructed signal $I_{M,Bet}$ represents both the loading of the actuator by the actuating force $F_{Bet}$ and the increase in friction in the electromechanic drive train which is due to this loading.

When the brake is applied, the actuator must work counteracting the loading and in opposition to the mechanical efficiency so that the information about the actuating force is in any case contained and significantly identifiable in the actuator current. Therefore, a determination of the adaptation parameters to update the force-travel characteristic curve by way of the actuator signals is possible when the brake is applied. When the brake is released, there is the possibility (especially in the presence of a poor mechanical efficiency) that the information is no longer significantly identifiable in the current. Updating of the characteristic curve cannot be performed in this case when the brake is released.

To identify the parameters X and $X_V$ on the basis of the reconstructed signal $I_{M,Bet}$ in consideration of equation (4), a recursive or non-recursive parameter estimation process known from prior art literature may be used which is generally based on minimizing a quadratic quality criterion (see function block 500). Because virtually known methods are employed in this respect, there is no need for a detailed consideration of the parameter estimation process hereinbelow. When employing the parameter estimation, care should be taken that an identification of the parameters being sought is ensured and that the identification can supply reasonable results only if the parameters are sufficiently excited by the signals.

Further, it is appropriate to check the estimated parameters for plausibility (see function block 600) and, only after the availability of plausible adaptation parameters is confirmed, to release these parameters also as up-to-date parameters (see function block 700). Otherwise, the old parameters may be maintained (see function block 800).

The reconstruction of the actuating force is performed according to equation (4) by way of the basis characteristic curve and in consideration of the adaptation parameters identified on the basis of the actuator signal sensor means (see item 12, FIG. 2).

If an identification ability is not detected, further model parameters of the electric brake can be updated as the requirements may be (see function block 900), and the relevant parameters of the preceding step can be maintained (see function block 800) in the determination of $F_{Bet}$ (see item 12, FIG. 2).

What is claimed is:

1. Process of generating defined actuating forces by which brake pads are pressed against a brake disc, in a brake which is electrically operable by way of an actuator, wherein there is a first static relation between the brake's actuating travel, and the actuating force of the brake generated by the actuator, and the first static relation is depicted by a mathematical model, comprising the step of:

deriving a second relation which corresponds to the operation of the brake, wherein said second relation is determined from the first relation and information which represents variations of the first relation determining the information representing the variations of the first relation by evaluating signals which occur during operation of the brake further including the signals which occur during operation of the brake to represent the position of the actuator and the current value to be sent to the actuator.

2. Process as claimed in claim 1, further including defining the information which represents the variations of the first relation is a characteristic curve which illustrates extension or compression.

3. Process as claimed in claim 1, further including determining the speed or the acceleration of the actuator.

4. Process as claimed in claim 1, defining the information which represents the variations of the first relation as a displacement travel ($X_V$) of a shifted static characteristic curve which represents the first relation.

5. Process as claimed in claim 4, wherein the second relation is determined according to the formula $$F_{Bet} = f(X_{Bet}) = \lambda \cdot f_{Basis}(X_{Bet} - X_V)$$

wherein $f_{Basis}$ is the first relation, $\lambda$ is an extension or compression factor, $X_{Bet}$ is the actuating travel of the brake, and $X_V$ is the displacement travel.

6. Process as claimed in claim 1, using the speed or the acceleration of the actuator to determine the portion of the current being supplied to the actuator, wherein said portion corresponding to the actuating force.

7. Process as claimed in claim 6, checking the established values of the extension or compression factor and of the displacement travel for plausibility before they are employed.

8. Process as claimed in claim 6, further including monitoring the parameter estimation process by using the signal representative of the speed of the actuator.

9. Control system for generating defined actuating forces by which brake pads are pressed against a brake disc, in a brake which is electrically operable by way of an actuator, wherein there is a first static relation between the brake's actuating travel, which has to be covered for application of the brake pads against the brake disc, and the actuating force of the brake generated by the actuator, and the first static relation is depicted by a mathematical model, comprising:

a) a position controller to which the control difference between a nominal actuator position and signals representative of the actual actuator position is sent as an input signal, and connected downstream of which controller is an electronic servo booster having an output signal which actuates the actuator, b) a characteristic curve adaption and adaption monitoring module, to which the output signal of the servo booster and the signal representative of the actual actuator position are sent as input quantities, and which furnishes an information about variations of the first relation which occur during operation of the brake, c) a performance graph module for receiving said information and calculating actuating travel nominal values from actuating force nominal values in consideration of the variation information, and connected downstream of which module is a conversion module which calculates signals representative of the nominal actuator position from the actuating travel nominal values.

10. Control system as claimed in 9, wherein the conversion module represents a mathematical model of a gear that acts between the actuator and the brake.

11. Control system for generating defined actuating forces in a brake which is electrically operable by way of an actuator, wherein there is a first static relation between the brake's actuating travel and the actuating force, comprising:

a) a deceleration controller to which the control difference between signals representative of an actuating force nominal value and an actuating force actual value is sent as an input signal, and connected downstream of which controller is an electronic servo booster having an output signal which actuates the actuator, b) a characteristic curve adaption and adaption monitoring module to which the output signal of the servo booster and the signal representative of the actual actuator position are sent as input quantities, and which furnishes an information about variations of the first relation which occur during operation of the brake, on the one hand, and a signal representative of the actuating travel actual value, on the other hand, which c) are sent to a performance graph module which calculates actuating force actual values from actuating travel actual values in consideration of the variation information.

12. Control system as claimed in claim 11, wherein the information about variations of the first relation, which occur during operation of the brake, are sent to the deceleration controller to update said's parameters.

13. Control system as claimed in claim 11, wherein the brake is installed in an automotive vehicle, and wherein an information representative of the rotational speed of the automotive vehicle wheel is sent to the characteristic curve adaption and adaption monitoring module.

14. Process of generating defined actuating forces by which brake pads are pressed against a brake disc, in a brake which is electrically operable by way of an actuator, wherein there is a first static relation between the brake's actuating travel, and the actuating force of the brake generated by the actuator, and the first static relation is depicted by a mathematical model, comprising the step of:

deriving a second relation which corresponds to the operation of the brake, wherein said second relation is determined from the first relation and information which represents variations of the first relation defining the information which represents the variations of the first relation as a displacement travel ($X_V$) of a shifted static characteristic curve which represents the first relation.

15. Process of generating defined actuating forces by which brake pads are pressed against a brake disc, in a brake which is electrically operable by way of an actuator, wherein there is a first static relation between the brake's actuating travel, and the actuating force of the brake generated by the actuator, and the first static relation is depicted by a mathematical model, comprising the step of:

deriving a second relation which corresponds to the operation of the brake, wherein said second relation is determined from the first relation and information which represents variations of the first relation defining the information which represents the variations of the first relation is a characteristic curve which illustrates extension or compression.

* * * * *